US012694266B2

(12) United States Patent
Bae et al.

(10) Patent No.: US 12,694,266 B2
(45) Date of Patent: Jul. 28, 2026

(54) CORRELATION RECURRENT UNIT FOR IMPROVING PREDICTION PERFORMANCE OF TIME-SERIES DATA AND CORRELATION RECURRENT NEURAL NETWORK

(71) Applicant: Pusan National University Industry-University Cooperation Foundation, Busan (KR)

(72) Inventors: Hye Rim Bae, Busan (KR); Sung-hyun Sim, Busan (KR); Do Hee Kim, Busan (KR); Han Seok Kang, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 783 days.

(21) Appl. No.: 18/086,646

(22) Filed: Dec. 22, 2022

(65) Prior Publication Data

US 2023/0267304 A1     Aug. 24, 2023

(30) Foreign Application Priority Data

Feb. 24, 2022     (KR) ........................ 10-2022-0024013

(51) Int. Cl.
*G06N 3/044*          (2023.01)

(52) U.S. Cl.
CPC .................................. *G06N 3/044* (2023.01)

(58) Field of Classification Search
CPC .. G06N 3/00; G06N 5/00; G06N 7/00; G06N 20/00; G06N 99/00
See application file for complete search history.

(56) References Cited

FOREIGN PATENT DOCUMENTS

KR      10-2009-0078501 A      7/2009
KR            10-2226687 B1      3/2021
KR            10-2236678 B1      4/2021

OTHER PUBLICATIONS

Zhigang Shi, Yuting Bai, Xuebo Jin, Xiaoyi Wang, Tingli Su, & Jianlei Kong (2021). Parallel deep prediction with covariance intersection fusion on non-stationary time series. Knowledge-Based Systems, 211, 106523. (Year: 2021).*
X. Zhang, L. Tang and J. Chen, "Fault Diagnosis for Electro-Mechanical Actuators Based on STL-HSTA-GRU and SM," in IEEE Transactions on Instrumentation and Measurement, vol. 70, pp. 1-16, 2021, Art No. 3527716, doi: 10.1109/TIM.2021.3127641 (Year : 2021).*

(Continued)

*Primary Examiner* — Kakali Chaki
*Assistant Examiner* — Johnathan R Germick
(74) *Attorney, Agent, or Firm* — CANTOR COLBURN LLP

(57) ABSTRACT

A correlation recurrent unit and a correlation recurrent neural network are provided. An aspect provides a new neural network structure for training each decomposed time-series component by decomposing input time-series data $x_t$ into a plurality of time-series components (e.g., trend, seasonal, and remainder components) and improving the prediction performance of time-series data by training a relation between different time-series components.

7 Claims, 4 Drawing Sheets

(56) References Cited

OTHER PUBLICATIONS

Xiaoyu Zhang et al., "Fault Diagnosis for Electro-Mechanical Actuators Based on STL-HSTA-GRU and SM", IEEE Transactions On Instrumentation and Measurement, vol. 70, 2021.
Y J Tian et al., "A Short-Term Electricity Forecasting Scheme Based on Combined GRU Model with STL Decomposition", IOP Conf. Ser.: Earth Environ. Sci. 701, 012008, 2021, IOP Publishing Ltd.

* cited by examiner

| Model | UTD1 | | UTD2 | | UTD3 | | UTD4 | | UTD5 | |
|---|---|---|---|---|---|---|---|---|---|---|
| | RMSE | MAPE | RMSE | MAPE | RMSE | MAPE | RMSE | MAPE | RMSE | MAPE |
| CRU* | 104.766 (1.904) | 0.491 (0.012) | 9.889 (0.010) | 0.456 (0.001) | 7.296 (0.001) | 0.615 (0.001) | 20.093 (0.030) | 1.595 (0.003) | 0.676 (0.006) | 1.841 (0.022) |
| RNN-STLC | 110.712 (2.425) | 0.543 (0.014) | 10.420 (0.013) | 0.506 (0.001) | 7.678 (0.001) | 0.665 (0.001) | 25.409 (0.041) | 1.673 (0.004) | 0.714 (0.004) | 1.898 (0.016) |
| LSTM-STLC | 109.973 (2.832) | 0.539 (0.016) | 10.790 (0.108) | 0.521 (0.006) | 7.730 (0.002) | 0.673 (0.001) | 26.298 (0.224) | 1.746 (0.018) | 0.712 (0.007) | 1.890 (0.022) |
| GRU-STLC | 110.752 (2.081) | 0.545 (0.013) | 10.503 (0.043) | 0.508 (0.002) | 7.680 (0.001) | 0.665 (0.001) | 25.491 (0.076) | 1.681 (0.007) | 0.710 (0.005) | 1.889 (0.017) |
| RNN-STLD | 112.889 (0.118) | 0.539 (0.012) | 11.337 (0.789) | 0.645 (0.031) | 8.228 (0.002) | 0.706 (0.001) | 26.537 (0.006) | 1.720 (0.007) | 0.796 (0.001) | 2.074 (0.006) |
| LSTM-STLD | 115.309 (0.457) | 0.552 (0.008) | 12.018 (1.494) | 0.687 (0.021) | 8.230 (0.001) | 0.707 (0.001) | 26.539 (0.001) | 1.716 (0.001) | 0.808 (0.001) | 2.105 (0.006) |
| GRU-STLD | 113.888 (0.533) | 0.531 (0.005) | 11.304 (0.652) | 0.641 (0.010) | 8.230 (0.001) | 0.705 (0.001) | 26.539 (0.001) | 1.716 (0.001) | 0.808 (0.001) | 2.104 (0.011) |
| RNN | 120.707 (3.183) | 0.872 (0.124) | 12.283 (0.012) | 0.579 (0.001) | 9.016 (0.001) | 0.734 (0.001) | 30.689 (0.016) | 2.110 (0.007) | 0.863 (0.004) | 2.279 (0.021) |
| LSTM | 121.462 (3.476) | 0.876 (0.012) | 12.333 (0.022) | 0.583 (0.002) | 9.046 (0.001) | 0.736 (0.001) | 30.623 (0.008) | 1.984 (0.005) | 0.868 (0.001) | 2.291 (0.001) |
| GRU | 121.437 (3.455) | 0.775 (0.101) | 12.363 (0.015) | 0.584 (0.001) | 9.048 (0.001) | 0.736 (0.001) | 30.570 (0.006) | 2.079 (0.007) | 0.862 (0.006) | 2.272 (0.032) |

Avg. (Std. Dev.)

FIG. 3

| | MTD1 | | MTD2 | | MTD3 | | MTD4 | |
|---|---|---|---|---|---|---|---|---|
| | RMSE | MAPE | RMSE | MAPE | RMSE | MAPE | RMSE | MAPE |
| CRU* | 20.15 (0.41) | 1.56 (0.03) | 42.63 (0.16) | 2.00 (0.04) | 95.17 (3.17) | 0.91 (0.04) | 9556.8 (455.7) | 5.22 (0.18) |
| RNN-STLC | 21.28 (0.80) | 1.64 (0.06) | 47.51 (0.22) | 2.58 (0.05) | 107.55 (3.74) | 1.02 (0.05) | 10462.1 (579.1) | 5.37 (0.26) |
| LSTM-STLC | 24.63 (1.70) | 1.71 (0.31) | 46.30 (0.17) | 2.31 (0.12) | 115.91 (5.82) | 1.14 (0.08) | 10559.3 (354.6) | 5.36 (0.20) |
| GRU-STLC | 22.21 (1.52) | 1.69 (0.05) | 48.00 (0.43) | 2.69 (0.11) | 111.80 (5.61) | 1.09 (0.11) | 10606.5 (431.7) | 5.40 (0.18) |
| RNN-STLD | 25.38 (2.45) | 1.94 (0.12) | 47.75 (0.33) | 2.61 (0.41) | 190.65 (6.88) | 1.95 (0.15) | 11115.8 (541.9) | 6.13 (0.56) |
| LSTM-STLD | 24.91 (1.98) | 1.82 (0.09) | 47.05 (0.15) | 2.45 (0.18) | 184.89 (5.98) | 1.81 (0.08) | 10905.1 (336.8) | 5.85 (0.45) |
| GRU-STLD | 25.01 (2.22) | 1.88 (0.10) | 47.69 (0.21) | 2.54 (0.25) | 181.74 (5.51) | 1.78 (0.12) | 10987.6 (401.2) | 5.77 (0.47) |
| RNN | 29.66 (2.87) | 3.11 (0.39) | 48.65 (0.02) | 2.70 (0.03) | 212.12 (8.72) | 2.30 (0.22) | 12701.9 (468.4) | 8.80 (0.50) |
| LSTM | 26.85 (1.45) | 2.42 (0.08) | 48.05 (0.03) | 2.65 (0.02) | 202.98 (6.54) | 2.01 (0.19) | 12696.7 (462.3) | 7.99 (0.28) |
| GRU | 26.37 (1.83) | 2.51 (0.27) | 48.19 (0.02) | 2.75 (0.02) | 205.02 (9.67) | 2.16 (0.15) | 12719.2 (444.9) | 8.05 (0.13) |
| | | | | | | | | Avg. (Std. Dev.) |

FIG. 4

CORRELATION RECURRENT UNIT FOR IMPROVING PREDICTION PERFORMANCE OF TIME-SERIES DATA AND CORRELATION RECURRENT NEURAL NETWORK

CROSS-REFERENCE TO RELATED APPLICATION(S)

This application claims the priority benefit of Korean Patent Application No. 10-2022-0024013 filed on Feb. 24, 2022, in the Korean Intellectual Property Office, the disclosure of which is incorporated herein by reference for all purposes.

BACKGROUND

1. Field

One or more embodiments relate to a new time-series prediction neural network for training an autocorrelation degree and a correlation degree between time-series components decomposed from time-series data, and more particularly, to a method of improving the prediction accuracy of time-series data by establishing a correlation recurrent neural network including a correlation recurrent unit (CRU) for training a relation between different time-series components.

2. Description of Related Art

A deep learning model may include an autoregressive integrated moving average (ARIMA) model, a recurrent neural network (RNN) model, a long short-term memory (LSTM) model, a gated recurrent unit (GRU) model, and the like, in which the deep learning model is used to predict next time-series data with high accuracy through artificial intelligence (AI) training of pieces of time-series data on a physical quantity generated at a certain time interval.

However, among typical deep learning models, the RNN model may not be further trained by using the latest piece of time-series data due to a memory loss, in which a weight in the past is provided back as feedback and a value converges to 0 when additional training is performed after a certain degree of training. In addition, overfitting may occur in the GRU model that is proposed by improving the LSTM model of which a configuration is relatively complicated.

To compensate for such issues, a deep learning model is proposed, in which a seasonal-trend decomposition using LOESS (STL), that is, one of the time-series decomposition algorithms, is combined with typical deep learning models, such as the ARIMA, RNN, LSTM, and GRU models.

FIG. 1 is a diagram illustrating a deep learning model used to predict time-series data, according to a related art.

Referring to FIG. 1, a deep learning model 100 combined with an STL may perform time-series decomposition on time-series data that is input by using the STL, decompose the input time-series data into a trend component, a seasonal component, and a remainder component, generate models (a Model₁, a Model₂, and a Model₃) based on the typical deep learning models, such as the ARIMA, RNN, LSTM, and GRU models, for each decomposed time-series component, aggregate the generated models Model₁, Model₂, and Model₃, and perform an overall time-series prediction.

The deep learning model 100 combined with an STL may improve the accuracy of time-series prediction, compared to the typical deep learning models, such as the RNN, LSTM, and GRU models, but may not readily learn a relation between time-series components because training of the time-series components decomposed from the time-series data is independently performed in an independent model as illustrated in FIG. 1.

Accordingly, a new time-series prediction neural network for predicting time-series data with high accuracy is proposed in the present disclosure by using a relation between different time-series components decomposed from time-series data together.

SUMMARY

An aspect provides a new neural network structure for training each decomposed time-series component by decomposing input time-series data $x_t$ into a plurality of time-series components (e.g., trend, seasonal, and remainder components) and improving the prediction performance of time-series data by training a relation between different time-series components.

Another aspect also provides a method of establishing a correlation recurrent neural network including a correlation recurrent unit (CRU) and the CRU for performing training by increasing a weight on a previous hidden state value of high relevance by determining to which degree the previous hidden state value is used when generating a current hidden state value, based on an autocorrelation degree with the previous hidden state value of each of time-series components that are decomposed from time-series data and a correlation degree with the previous hidden state value between each of the time-series components.

According to an aspect, there is provided a CRU including an STL cell configured to decompose time-series data $x_t$ corresponding to a time t when the time-series data $x_t$ is input, based on a selected time-series composition algorithm, into a plurality of time-series components; an autocorrelation gate configured to obtain an autocorrelation degree with a hidden state value corresponding to a time $t-1$ of each of the plurality of time-series components with respect to each of the plurality of time-series components; a correlation gate configured to obtain a correlation degree with a hidden state value corresponding to a time $t-1$ of another time-series component different from each of the plurality of time-series components with respect to each of the plurality of time-series components; and a generation gate configured to determine whether to update the hidden state value of the time $t-1$ generated for each of the plurality of time-series components, based on the autocorrelation degree and the correlation degree, when previous time-series data $x_{t-1}$ prior to the time-series data $x_t$ is input.

According to another aspect, there is provided a correlation recurrent neural network including a plurality of CRUs for predicting time-series data, in which each of the plurality of CRUs includes an STL cell configured to decompose, into a trend component $x_{t\_trend}$, a seasonal component $x_{t\_seasonal}$, time-series data $x_t$ at a time t when the time-series data $x_t$ is input, and a remainder component $x_{t\_remainder}$; an autocorrelation gate configured to estimate and obtain, with respect to the trend component $x_{t\_trend}$ at the time t, an autocorrelation degree $$\hat{a}_t^t$$

with a first hidden state value relevant to a trend component $x_{t-1\_trend}$ corresponding to a time $t-1$ prior to the time t and estimate and obtain, with respect to the seasonal component $x_{t\_seasonal}$ at the time t, an autocorrelation degree $$\hat{a}_t^s$$

with a second hidden state value relevant to the seasonal component $x_{t-1\_seasonal}$ corresponding to the time t−1; a correlation gate configured to estimate and obtain a correlation degree $$\hat{a}_t^t$$

with the second hidden state value with respect to the trend component $x_{t\_trend}$ at the time t and estimate and obtain a correlation degree $$\hat{a}_t^s$$

with the first hidden state value with respect to the seasonal component $x_{t\_seasonal}$ at the time t; and a generation gate configured to, when generating a hidden state value of each of a plurality of time-series components at the time t, increase a proportion of using the first hidden state value and the second hidden state value that are generated when time-series data $x_{t-1}$ at the time t−1 is input as the autocorrelation degrees $$\hat{a}_t^t$$

and $$\hat{a}_t^s$$

and the correlation degrees $$\hat{c}_t^t$$

and $$\hat{c}_t^s$$

increase.

According to another aspect, there is provided a new time-series prediction neural network model for training a correlation and an autocorrelation between decomposed time-series components by performing time-series decomposition in a single cell.

According to another aspect, a correlation recurrent neural network including a CRU for performing training by increasing a weight on a previous hidden state value relevant to a certain trend or seasonality with each time-series component or by increasing a weight on the previous hidden state value having relevance in a certain trend or seasonality even with different time-series components may be established such that the accuracy of time-series prediction may be improved compared to the prior art.

An approximately 10% or more increase in the short- and long-term prediction performance of the CRU proposed in the present disclosure is proved after comparing the performance of the CRU with the performance of the models proposed in the prior art by using nine different time-series data sets collected from fields, such as shipping, economy, stocks, and the like.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 3 is a table representing prediction performance on five different pieces of time-series data by a correlation recurrent neural network according to an embodiment; and FIG. 4 is a table representing prediction performance on four different pieces of time-series data by a correlation recurrent neural network according to an embodiment.

DETAILED DESCRIPTION

Figure 1:
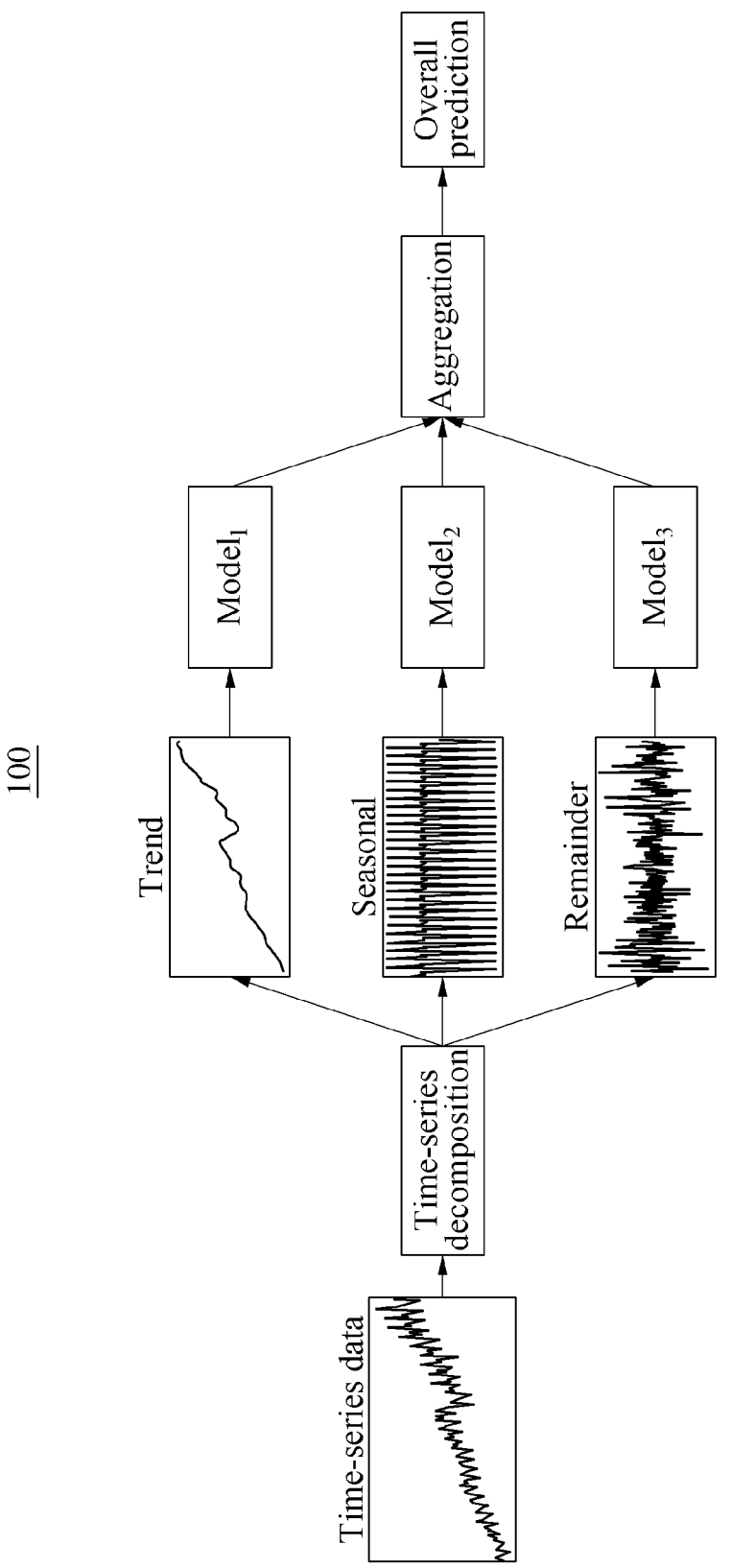
FIG. 1 is a diagram illustrating a deep learning model used to predict time-series data, according to a related art.

Hereinafter, examples will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

A correlation recurrent neural network for improving the performance of time-series prediction proposed in the present disclosure may include a plurality of correlation recurrent units (CRUs), and each of the CRUs may be implemented by, for example, a memory cell for maintaining a hidden state value based on time-series data training.

When training time-series data $x_t$ at a time t that is to be newly input when time-series data $x_{t-1}$ corresponding to a time t−1, that is, a previous time, has been trained, each of the CRUs may update a hidden state value $h_{t-1}$ at the time t−1 generated when training the time-series data $x_{t-1}$ and generate a hidden state value $h_t$ at the time t based on the training of the time-series data $x_t$. In this case, each of the CRUs may refer to some of the hidden state value $h_{t-1}$, of which relevance to the time-series data $x_t$, that is, a new input, is high, of the already generated hidden state value $h_{t-1}$ at the time t−1.

In other words, each of the CRUs may determine to which degree the already generated hidden state value $h_{t-1}$ at the time t−1 is referred, based on the relevance to the time-series data $x_t$ and update the hidden state value $h_t$ at the time t.

In this case, each of the CRUs may decompose the time-series data $x_t$ at the time t into a plurality of time-series components including a trend component and a seasonal component, estimate relevance (an autocorrelation degree) with the hidden state value $h_{t-1}$ at the time t−1 for each time-series component, and determine whether to use the hidden state value $h_{t-1}$ at the time t−1 based on the relevance (the autocorrelation degree).

Accordingly, at the time t−1, the time t, a time t+1, and the like, when time-series data is input to each of the CRUs, each of the CRUs may perform training based on the autocorrelation degree (the relevance) with the hidden state value $h_{t-1}$ at a previous time of the same time-series component in each of the CRUs.

Generally, in the case of time-series data corresponding to a physical quantity generated at a certain time interval, time-series prediction for the future may be performed by analyzing an increasing (upward) or decreasing (downward) trend or tendency over time in the physical quantity or by analyzing a repeated pattern or periodicity, for example, seasonality, of the physical quantity over time, and noise remaining in the physical quantity over time may be analyzed, reflected in time-series prediction, and used to improve prediction accuracy.

Typically, for separate training of time-series data, model 1 for analyzing a trend of a time series, model 2 for analyzing the seasonality of the time series, and model 3 for analyzing the noise (remainder) of the time series may each be provided and aggregated to configure a time-series prediction model. When configuring a time-series prediction model reflecting the relevance to the trend, seasonality, and noise of a time series in an operation of training time-series data, a time-series prediction result of high accuracy with a trend and seasonality being considered may be obtained.

Accordingly, in the present disclosure, proposed is a CRU for training an autocorrelation degree with a hidden state value $h_{t-1}$ at a previous time t−1 of the same time-series component as each of time-series components and a correlation degree with the hidden state value $h_{t-1}$ at a previous time of a time-series component different from each of the time-series components.

The CRU may determine whether to use or update the hidden state value $h_{t-1}$ at the time t−1 by considering the relevance between different time-series components, besides the same time-series component.

Accordingly, a correlation recurrent neural network including a CRU for performing training by increasing a weight on a previous hidden state value to which a time-series component is individually relevant to a certain trend or seasonality or by increasing a weight on a previous hidden state value having relevance even to different time-series components in terms of a certain trend or seasonality may be established in the present disclosure such that the accuracy of time-series prediction may increase compared to the prior art.

Figure 2:
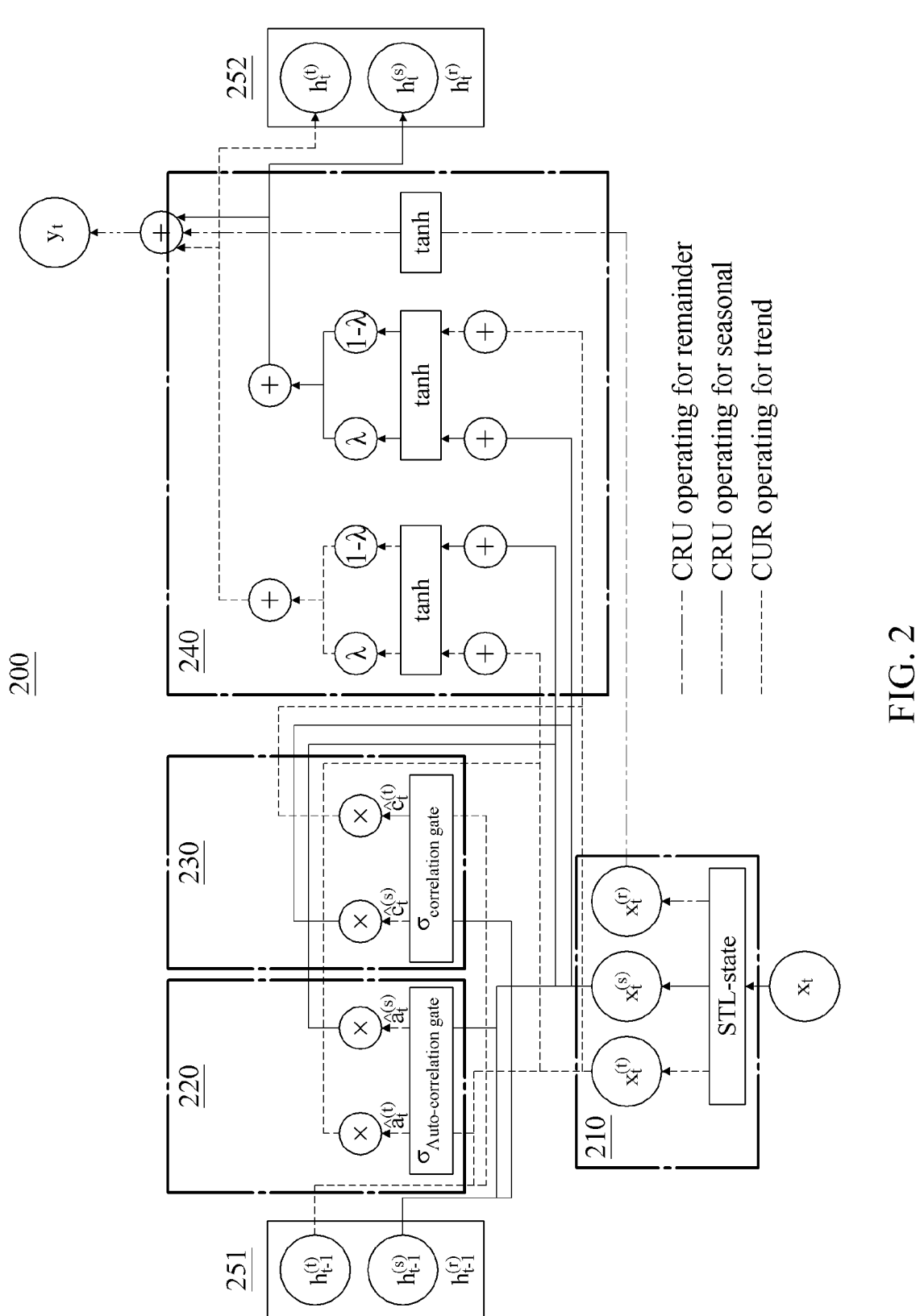
FIG. 2 is a diagram illustrating an internal configuration of a correlation recurrent unit included in a correlation recurrent neural network according to an embodiment.

FIG. 2 is a diagram illustrating an internal configuration of a correlation recurrent unit included in a correlation recurrent neural network according to an embodiment.

Referring to FIG. 2, a CRU 200 may include a seasonal-trend decomposition using LOESS (STL) cell 210, an autocorrelation gate 220, a correlation gate 230 and a generation gate 240.

The STL cell 210 may decompose, into a plurality of time-series components, time-series data $x_t$ corresponding to a time t when the time-series data $x_t$ is input, based on a selected time-series decomposition algorithm.

For example, the STL cell 210 may decompose the time-series data $x_t$ into the plurality of time-series components at least including a trend component $x_{t\_trend}$ and a seasonal component $x_{t\_seasonal}$, based on an STL, in which the trend component $x_{t\_trend}$ is relevant to an upward or downward trend from the time t and the seasonal component $x_{t\_seasonal}$ is relevant to a periodic pattern repeated from the time t.

Specifically, the STL cell 210 may decompose the time-series data $x_t$, that is, a new input to the CRU 200, a trend, seasonality, and remainder noise included by the time-series data $x_t$ by using the STL algorithm throughout the following steps.

In a first step, the STL cell 210 may suitably estimate a trend from the time-series data $x_t$ through least squares, remove the estimated trend from the time-series data $x_t$, generate trend-adjusted time-series data, and use the trend-adjusted time-series data as the trend component $x_{t\_trend}$.

In a second step, the STL cell 210 may obtain a moving average of the length of seasonality with an adjusted trend obtained in the first step, remove the seasonality, divide the moving average by a seasonality-removed time series, and primarily estimate the seasonality.

In a third step, the STL cell 210 may obtain an average of each season of the seasonality estimated in the second step, adjust a sum of the averages of seasons to be the length of seasonality, generate a 'seasonal index', and use the generated seasonal index as the seasonal component $x_{t\_seasonal}$.

In a fourth step, the STL cell 210 may use, as the remainder component, a remaining component excluding the trend component $x_{t\_trend}$ and the seasonal component $x_{t\_seasonal}$ from the time-series data $x_t$.

The autocorrelation gate 220 may obtain an autocorrelation degree with a hidden state value 251 corresponding to a time t−1 of each time-series component with respect to the plurality of time-series components.

The autocorrelation gate 220 may be a gate for estimating an autocorrelation degree (relevance) with a hidden state value at a previous time of a time-series component of the same series as that of each decomposed time-series component and use a Sigmoid function to obtain the autocorrelation degree.

Specifically, the autocorrelation gate 220 may estimate and obtain an autocorrelation degree $$\hat{a}_t^t$$

with a first hidden state value $h_{t-1\_trend}$ corresponding to the time t−1 of the same trend component as the trend component $x_{t\_trend}$ of the plurality of time-series components.

$$\hat{a}_t^t = \sigma\left(w_{x^t h^t} x_t^t + w_{h^t h^t} h_{t-1}^t + b_{\hat{a}}^t\right) \qquad \text{[Equation 1]}$$

TABLE 1

| | |
|---|---|
| $\hat{a}_t^t$ | Value of autocorrelation gate with respect to trend component at time t = estimated value of autocorrelation degree, of trend component at time t, with hidden state at time t − 1 corresponding to trend component |
| σ | Sigmoid function (outputting a value between 0 and 1 of Sigmoid function) |
| $W_{x^t h^t x_t^t}$ | Weight value of trend component at time t with hidden state |
| $W_{h^t h^t h_{t-1}^t}$ | Hidden state weight value with respect to trend component at time t − 1 |
| $b_{\hat{a}}^t$ | Bias value of autocorrelation gate with respect to trend component |

In addition, the autocorrelation gate 220 may estimate and obtain an autocorrelation degree $$\hat{a}_t^s$$

with a second hidden state value $h_{t-1\_seasonal}$ corresponding to the time t−1 of the same seasonal component as the seasonal component $x_{t\_seasonal}$ of the plurality of time-series components.

$$\hat{a}_t^s = \sigma\left(w_{x^s h^s} x_t^s + w_{h^s h^s} h_{t-1}^s + b_{\hat{a}}^s\right) \qquad \text{[Equation 2]}$$

TABLE 2

| | |
|---|---|
| $\hat{a}_t^s$ | Value of autocorrelation gate with respect to seasonal component at time t = estimated value of autocorrelation degree, of seasonal component at time t, with hidden state at time t − 1 corresponding to seasonal component |
| σ | Sigmoid function |
| $W_{x^s h^s x_t^s}$ | Weight value of seasonal component at time t with hidden state |
| $W_{h^s h^s h_{t-1}^s}$ | Hidden state weight value with respect to seasonal component at time t − 1 |
| $b_{\hat{a}}^s$ | Bias value of autocorrelation gate with respect to seasonal component |

The correlation gate 230 may obtain a correlation degree with the hidden state value 251 corresponding to the time t−1 of a time-series component different from each time-series component with respect to each of the plurality of time-series components.

The correlation gate 230 may be a gate for estimating a correlation degree with a hidden state value of a previous time of a time-series component different from a decomposed time-series component and use a Sigmoid function to estimate the correlation degree.

Specifically, the correlation gate 230 may estimate and obtain a correlation degree $$\hat{c}_t^t$$

with the second hidden state value $h_{t-1}$ seasonal corresponding to the time t−1 of a seasonal component different from the trend component $x_{t\_trend}$ of the plurality of time-series components.

$$\hat{c}_t^t = \sigma\left(w_{x^t h^t} x_t^t + w_{h^t h^t} h_{t-1}^s + b_{\hat{c}}^t\right) \qquad \text{[Equation 3]}$$

TABLE 3

| | |
|---|---|
| $\hat{c}_t^t$ | Value of correlation gate with respect to trend component at time t = estimated value of correlation degree, of trend component at time t, with hidden state at time t − 1 corresponding to remainder seasonal component |
| σ | Sigmoid function |
| $W_{x^t h^t x_t^t}$ | Weight value of trend component at time t with hidden state |
| $W_{h^t h^t h_{t-1}^s}$ | Hidden state weight value with respect to trend component at time t − 1 |
| $b_{\hat{c}}^t$ | Bias value of correlation gate with respect to trend component |

In addition, the correlation gate 230 may estimate and obtain a correlation degree $$\hat{c}_t^s$$

with the first hidden state value $h_{t-1\_trend}$ corresponding to the time t−1 of a trend component different from the seasonal component $x_{t\_seasonal}$ of the plurality of time-series components.

$$\hat{c}_t^s = \sigma\left(w_{x^s h^s} x_t^s + w_{h^s h^s} h_{t-1}^t + b_{\hat{c}}^s\right) \qquad \text{[Equation 4]}$$

TABLE 4

| | |
|---|---|
| $\hat{c}_t^s$ | Value of correlation gate with respect to seasonal component at time t = estimated value of correlation degree, of seasonal component at time t, with hidden state at time t − 1 corresponding to remainder trend component |
| σ | Sigmoid function |
| $W_{x^s h^s x_t^s}$ | Weight value of seasonal component at time t with hidden state |
| $W_{h^s h^s h_{t-1}^t}$ | Hidden state weight value with respect to seasonal component at time t − 1 |
| $b_{\hat{c}}^s$ | Bias value of correlation gate with respect to seasonal component |

The generation gate 240 may generate a hidden state value 252 at a time t of each time-series component by updating the hidden state value 251 at the time t−1 generated for each time-series component, through the training of the time-series data $x_t$, when previous time-series data $x_{t-1}$ prior to the time-series data $x_t$ is input to the generation gate 240.

The generation gate 240 may determine whether to use the hidden state value 251 at the time t−1, based on the relevance of each time-series component to the hidden state value 251 at the time t−1.

In other words, the generation gate 240 may use the hidden state value 251 at the time t−1, in which an autocorrelation degree between the same time-series component as each time-series component decomposed from the time-series data $x_t$ is high, and use the hidden state value 251 at the time t−1, in which a correlation degree between a time-series component different from each time-series component is high.

When the autocorrelation degree or the correlation degree is close to 1 in a predetermined range of 0 to 1, the relevance between the time-series data $x_t$ and a previous hidden state value is high. When the autocorrelation degree or the correlation degree is close to 0 in the predetermined range of 0 to 1, the relevance between the time-series data $x_t$ and the previous hidden state value is low.

The generation gate 240 may identify a first time-series component, of which the autocorrelation degree or the correlation degree is close to 1, of the plurality of time-series components and generate the hidden state value 252 $h_t$ at the time t by using (referring to) the hidden state value 251 $h_{t-1}$ corresponding to the time t−1.

In addition, the generation gate 240 may identify a second time-series component, of which the autocorrelation degree or the correlation degree is close to 0 in the predetermined range of 0 to 1, of the plurality of time-series components and generate the hidden state value 252 $h_t$ at the time t by updating the second time-series component without using (referring to) the hidden state value 251 $h_{t-1}$ corresponding to the time t−1.

Accordingly, the generation gate 240 may generate the hidden state value 252 at the time t by referring to the hidden state value 251 at the time t−1 of which relevance to the time-series data $x_t$ is high, based on the autocorrelation degree and the correlation degree with the hidden state value 251 at the time t−1 for each time-series component decomposed from the time-series X data.

In another example, the generation gate 240 may determine whether to use the hidden state value 251 at the time t−1, based on the autocorrelation degree and the correlation degree obtained by the autocorrelation gate 220 and the correlation gate 230 and a Hadamard product operation ⊙ with the hidden state value $h_{t-1}$ at the time t−1.

Specifically, the generation gate 240 may respectively perform a Hadamard product operation ⊙ with the hidden state value $h_{t-1}$ at the time t−1 on the autocorrelation degrees $$\hat{a}_t^t$$

and $$\hat{a}_t^s$$

the correlation degrees $$\hat{c}_t^t$$

and $$\hat{c}_t^s,$$

evaluate the relevance to the time-series data $x_t$ with respect to the hidden state value 251 $h_{t-1}$ at the time t−1, based on a value of the Hadamard product operation, and determine whether to use the hidden state value 251 $h_{t-1}$ at the time t−1 with respect to each time-series component, based on the relevance.

For example, the generation gate 240 may perform a Hadamard product operation $$\hat{a}_t^t \odot h_{t-1}^t$$

on the first hidden state value $h_{t-1\_trend}$ and the autocorrelation degree $$\hat{a}_t^t$$

and perform a Hadamard product operation $$\hat{c}_t^t \odot h_{t-1}^s$$

on the second hidden state value $h_{t-1\_seasonal}$ and the correlation degree $$\hat{c}_t^t.$$

When the autocorrelation degree and the correlation degree respectively obtained by the autocorrelation gate 220 and the correlation gate 230 are close to 0 in the predetermined range of 0 to 1, values of the Hadamard product operations $$\hat{a}_t^t \odot h_{t-1}^t$$

and $$\hat{c}_t^t \odot h_{t-1}^s$$

may be close to 0. Therefore, the generation gate 240 may evaluate that the relevance of the first hidden state value $h_{t-1\_trend}$ and the second hidden state value $h_{t-1\_seasonal}$ to the time-series data $x_t$ is relatively low.

In this case, the generation gate 240 may update a time-series component of which relevance is evaluated to be low without referring to the hidden state value 251 $h_{t-1}$ at the time t−1 of the time-series component and generate the hidden state value 252 $h_t$ at the time t.

In addition, the generation gate 240 may perform a Hadamard product operation $$\hat{a}_t^s \odot h_{t-1}^s$$

on the second hidden state value $h_{t-1\_seasonal}$ and the autocorrelation degree $$\hat{a}_t^s$$

and perform a Hadamard product operation $$\hat{c}_t^s \odot h_{t-1}^t$$

on the first hidden state value $h_{t-1\_trend}$ and the correlation degree $$\hat{c}_t^s.$$

When the autocorrelation degree $$\hat{a}_t^s$$

and the correlation degree $$\hat{c}_t^s$$

respectively obtained by the autocorrelation gate 220 and the correlation gate 230 are close to 1 in the predetermined range of 0 to 1, values of the Hadamard product operations $$\hat{a}_t^s \odot h_{t-1}^s \text{ and } \hat{c}_t^s \odot h_{t-1}^t$$

may be close to 1. Therefore, the generation gate 240 may evaluate that the relevance of the first hidden state value $h_{t-1\_trend}$ and the second hidden state value $h_{t-1\_seasonal}$ to the time-series data $x_t$ is relatively high.

In this case, the generation gate 240 may use, as the hidden state value $h_t$ at the time t, the hidden state value 251 $h_{t-1}$ at the time t−1 for a time-series component of which relevance is evaluated to be high.

Accordingly, the generation gate 240 may decrease a proportion of using a hidden state at a previous time when relevance is low and increase a proportion of using the hidden state at the previous time when relevance is high when updating a hidden state value when new time-series data is input.

In other words, as expressed in Equation 5 below, the generation gate 240 may consider an autocorrelation degree and a correlation degree with respect to the trend component $x_{t\_trend}$ decomposed from the time-series data $x_t$ at the time t and relevance based on a Hadamard product operation $\odot$ with the hidden state value $h_{t-1}$ at the time t−1, determine whether to use the hidden state value 251 $h_{t-1}$ at the time t−1, and generate the hidden state value 252 $h_t$ at the time t with respect to the trend component $x_{t\_trend}$.

$$h_t^t = \lambda \times \tanh\left(w_{x^t h^t} x_t^t + w_{h^t h^t}\left(\hat{a}_t^t \odot h_{t-1}^t\right) + b_h^t\right) + \qquad \text{[Equation 5]}$$

$$(1 - \lambda) \times \tanh\left(w_{x^t h^t} x_t^t + w_{h^t h^t}\left(\hat{c}_t^t \odot h_{t-1}^S\right) + b_h^t\right)$$

In addition, as expressed in Equation 6 below, the generation gate 240 may consider an autocorrelation degree and a correlation degree with respect to the seasonal component $x_{t\_seasonal}$ decomposed from the time-series data $x_t$ at the time t and relevance based on a Hadamard product operation $\odot$ with the hidden state value $h_{t-1}$ at the time t−1, determine whether to use the hidden state value 251 $h_{t-1}$ at the time t−1, and generate the hidden state value 252 $h_t$ at the time t with respect to the seasonal component $x_{t\_seasonal}$.

$$h_t^s = \lambda \times \tanh\left(w_{x^s h^s} x_t^s + w_{h^s h^s}\left(\hat{a}_t^s \odot h_{t-1}^s\right) + b_h^s\right) + \qquad \text{[Equation 6]}$$

$$(1 - \lambda) \times \tanh\left(w_{x^s h^s} x_t^s + w_{h^s h^s}\left(\hat{c}_t^s \odot h_{t-1}^S\right) + b_h^s\right)$$

In addition, the remainder component $x_{t\_remainder}$ excluding the trend component $x_{t\_trend}$ and the seasonal component $x_{t\_seasonal}$ may correspond to noise, and whether to update the hidden state value $h_{t-1}$ at the time t−1 may be determined based on Equation 7.

$$h_t^r = \tan h(w_{x^r h^r} x_t^r + b_h^r) \qquad \text{[Equation 7]}$$

The terms used in the equations above are described in Table 5 below.

TABLE 5

| Classification | Description |
| --- | --- |
| $h_t^t$ | Update weight of hidden state with respect to trend component at time t |
| $h_t^s$ | Update weight of hidden state with respect to seasonal component at time t |
| $\lambda$ | Parameter for calculating weighted average on autocorrelation and correlation |
| $\odot$ | Hadamard product |
| $\hat{a}_t^s \odot h_{t-1}^s$ | Equation for evaluating impact of hidden state at time t − 1 through value obtained from autocorrelation gate |
| $\hat{c}_t^s \odot h_{t-1}^t$ | Equation for evaluating impact of hidden state at time t − 1 through value obtained from correlation gate |

In the present disclosure, a proportion of using a hidden state at a previous time may increase as relevance (an autocorrelation degree and a correlation degree) to the hidden state at the previous time of each time-series component decomposed from newly input time-series data increases, which may improve the accuracy of time-series prediction through a CRU for training a relation between time-series components and overcome 'memory loss' and 'overfitting' issues of a typical deep learning model.

In another embodiment, the correlation recurrent neural network in the present disclosure may include a plurality of CRUs 200 for predicting time-series data, and each of the plurality of CRUs 200 may include the STL cell 210, the autocorrelation gate 220, the correlation gate 230, and the generation gate 240.

The STL cell 210 may decompose the time-series data $x_t$, to be input, at the time t into the trend component $x_{t\_trend}$, the seasonal component $x_t$ seasonal, and the remainder component $x_{t\_remainder}$.

The autocorrelation gate 220 may estimate and obtain an autocorrelation degree $$\hat{a}_t^t$$

with a first hidden state value relevant to the trend component $x_{t-1\_trend}$ corresponding to a previous time t−1 with respect to the trend component $x_{t\_trend}$ at the time t. In addition, the autocorrelation gate 220 may estimate and obtain an autocorrelation degree $$\hat{a}_t^s$$

with a second hidden state value relevant to the seasonal component $x_{t-1\_seasonal}$ corresponding to the time t−1 with respect to the seasonal component $x_{t\_seasonal}$ at the time t.

Referring to FIG. 2, the autocorrelation gate 220 may be a gate for estimating an autocorrelation degree with a decomposed time-series component and a hidden state at a previous time corresponding to the decomposed time-series component and may include elements respectively represented by $$a_t^s \text{ and } a_t^s.$$

$$\hat{a}_t^s$$

may be an element for estimating an autocorrelation degree between $x^{S_t}$ and $$h_{t-1}^s,$$

$$\hat{a}_t^t$$

may be an element tor estimating an autocorrelation degree between $$x_t^t$$

and $h^{t-1}$, and the elements may be respectively represented by Equations 1 and 2.

The correlation gate 230 may estimate and obtain a correlation degree $$\hat{c}_t^t$$

with the second hidden state value with respect to the trend component $x_{t\_trend}$ at the time t. In addition, the correlation gate 230 may estimate and obtain a correlation degree $$\hat{c}_t^s$$

with the first hidden state value with respect to the seasonal component $x_{t\_seasonal}$ at the time t.

Referring to FIG. 2, the correlation gate 230 may be a gate for estimating a correlation degree with a hidden state at a previous time corresponding to a decomposed time-series component and a remainder component and may update a correlation between $x_t$, that is, a newly input variable, and a hidden state $h_{t-1}$ between different decomposed time-series components.

The correlation gate 230 may also include elements respectively represented by $$\hat{c}_t^s \text{ and } \hat{c}_t^t.$$

$$\hat{c}_t^s$$

may be an element for estimating a correlation degree between $x^{S_t}$ and $$h_{t-1}^s,$$

$$\hat{c}_t^t$$

may be an element for estimating a correlation degree between $$x_t^t$$

and $h^{t-1}$, and the elements may be respectively represented by Equations 3 and 4.

The autocorrelation gate 220 and the correlation gate 230 may both output a value between 0 to 1 through a Sigmoid function σ and output, as a result value, an autocorrelation degree in each time-series component and a correlation degree with another time-series component.

A value obtained by the autocorrelation gate 220 and the correlation gate 230 may be used by the generation gate 240 to update a whole hidden state.

The generation gate 240 may update the first hidden state value and the second hidden state value generated when the time-series data $x_{t-1}$ at the time t−1 is input, based on the autocorrelation degrees $$\hat{a}_t^t \text{ and } \hat{a}_t^s$$

obtained by the autocorrelation gate 220 and the correlation degrees $$\hat{c}_t^t \text{ and } \hat{c}_t^s$$

obtained by the correlation gate 230, and may generate a hidden state value at the time t of each time-series component.

In the autocorrelation recurrent neural network proposed in the present disclosure, the whole hidden state may be in three dimensions, and the generation gate 240 may update the whole hidden state by multiplying a value trained through the autocorrelation gate 220 and the correlation gate 230 by a hidden state at the previous time t−1. A process of updating the whole hidden state may be represented by Equations 5 and 6.

When autocorrelation degrees $$\hat{a}_t^t \text{ and } \hat{a}_t^s$$

of a trend component and a seasonal component are close to 0 from 0 to 1, $$\hat{a}_t^s \odot h_{t-1}^s \text{ and } \hat{a}_t^t \odot h_{t-1}^t$$

of Equations 5 and 6 may be close to 0. Therefore, the generation gate 240 may decrease a proportion of using a hidden state at a previous time when updating a hidden state. When $$\hat{a}_t^t \text{ and } \hat{a}_t^s$$

are close to 1, the generation gate 240 may increase the proportion of using the hidden state at the previous time to update the whole hidden state.

In addition, when correlation degrees $$\hat{c}_t^t \text{ and } \hat{c}_t^s$$

of the trend component and the seasonal component are close to 0 from 0 to 1, $$\hat{c}_t^s \odot h_{t-1}^t \text{ and } \hat{c}_t^t \odot h_{t-1}^s$$

of Equations 5 and 6 may be close to 0. Therefore, the generation gate 240 may decrease the proportion of using the hidden state at the previous time when updating a hidden state. When the correlation degrees $$\hat{c}_t^t \text{ and } \hat{c}_t^s$$

are close to 1, the generation gate 240 may increase the proportion of using the hidden state at the previous time to update the hidden state.

In the present disclosure, a proportion of using a hidden state at a previous time may increase as relevance (an autocorrelation degree and a correlation degree) to the hidden state at the previous time of each time-series component decomposed from newly input time-series data increases, which may improve the accuracy of time-series prediction by establishing a correlation recurrent neural network including a CRU for training a relation between time-series components.

FIG. 3 is a table representing prediction performance on five different pieces of time-series data by a correlation recurrent neural network according to an embodiment.

The table illustrated in FIG. 3 compares and represents time-series prediction performance by typical models, such as RNN, LSTN, and GRU models, time-series prediction performance by deep learning models, such as RNN-STLC, LSTM-STLC, GRU-STLC, RNN-STLD, LSTM-STLD, and GRU-STLD models, combining the typical models with an STL, and time-series prediction performance by a CRU proposed in the present disclosure.

Referring to FIG. 3, five different types of time-series data, such as UTD1: 'US gross domestic product (GDP)', UTD2: 'Standard and Poor's (S&P) 500', UTD3: 'stock price of company A', UTD4: 'Baltic Dry Bulk Index', and UTD5: 'European Union (EU) Emissions Trading System (ETS) price', are used to compare time-series prediction performance, and the time-series prediction performance is represented in the form of Avg. (Std. Dev.), based on indices, such as a root mean square error (RMSE), a mean absolute percentage error (MAPE), and the like, calculated through statistical techniques.

In the table illustrated in FIG. 3, the Avg. (Std. Dev.) values of time-series data predicted by a CRU that has learned the five types of time-series data UTD1 to UTD5 are less than the Avg. (Std. Dev.) values obtained by any other models, which may verify that the accuracy of time-series prediction is improved when performed by the CRU.

FIG. 4 is a table representing prediction performance on four different pieces of time-series data by a correlation recurrent neural network according to an embodiment.

In FIG. 4, to more precisely verify time-series prediction performance, four types of time-series data different from the five types of time-series data used in FIG. 3 may be used, in which the four types of time-series data include MTD1: 'big tech stock price', MTD2: 'Baltic Dry Bulk Index', MTD3: 'major world stock indices', and MTD4: 'major world trade volume'.

As illustrated in FIG. 4, the Avg. (Std. Dev.) values of time-series data predicted by a CRU that has learned the four types of time-series data MTD1 to MTD4 are less than the Avg. (Std. Dev.) values obtained by any other models, which may verify that the accuracy of time-series prediction is ensured by the CRU.

By comparing the time-series prediction performance by the CRU with the time-series prediction performance by the other models by using nine different time-series datasets in FIGS. 3 and 4, the time-series prediction performance is proved to increase by approximately 10% or more in a short- and long-term.

Accordingly, when using a correlation recurrent neural network, which is proposed in the present disclosure, including CRUs that are established through training by using a relation between time-series components decomposed from time-series data, more accurate time-series data that is inferred from the relation between the time-series components may be predicted, and the prediction accuracy of time-series data may be ensured compared to simply aggregating the typical models, which are generated through independent training of time-series components, described with reference to FIG. 1.

APPLICATION EXAMPLES OF PRESENT DISCLOSURE

The model proposed in the present disclosure may be applied to various industries, such as shipping, finance, ports, and manufacturing.

1. Application Example in Stocks

When applying the present disclosure to 'Samsung Electronics stock price prediction' in the field of stocks, a user may use Samsung Electronics stock price data before a time t as input data, separate three time-series patterns, that is, trend, cycle, and remainder patterns, included in the input data, train an autocorrelation and a correlation between the separated time-series patterns, and predict and output a Samsung Electronics stock price at a time t+1, t+2, . . . the user desires to predict.

2. Application Example in Finance

When applying the present disclosure to 'Korea Composite Stock Price Index (KOSPI) prediction' in the financial field, a user may use KOSPI prediction data before a time t as input data, separate three time-series patterns, that is, trend, cycle, and remainder patterns, included in the input data, train an autocorrelation and a correlation between the separated time-series patterns, and predict and output a KOSPI value at a time t+1, t+2, . . . the user desires to predict. When integrated with robo-advisor technology that has recently been actively used, the present disclosure may be used to minimize a loss of a consumer and maximize profits.

3. Application Example in Shipping

When applying the present disclosure to 'freight index prediction' in the shipping field, a user may use freight index prediction data before a time t as input data, separate three time-series patterns, that is, trend, cycle, and remainder patterns, included in the input data, train an autocorrelation and a correlation between the separated time-series patterns, and predict and output a freight index value at a time t+1, t+2, . . . the user desires to predict. The present disclosure may predict the conditions of the shipping market based on predicted information or may use the predicted information to make decisions needed in the ship chartering and operation market.

4. Application Example in Ports

When applying the present disclosure to 'operation index prediction' in the field of ports, a user may use port operation log data before a time t as input data, separate three time-series patterns, that is, trend, cycle, and remainder patterns, included in the input data, train an autocorrelation and a correlation between the separated time-series patterns, and predict and output various operation indices, such as an estimated time of arrival and the degree of congestion, at a time t+1, t+2, . . . the user desires to predict. When establishing an operation plan of a port, operation indices, such as the degree of congestion of the port and an estimated time of arrival, may need to be considered. Therefore, the present disclosure may be integrated with an operation optimization tool, such as a terminal operating system (TOS).

5. Another Application Example in Ports

When applying the present disclosure to 'exports and imports prediction' in the field of ports, a user may use data on the volume of exports and imports before a time t as input data, separate three time-series patterns, that is, trend, cycle, and remainder patterns, included in the input data, train an autocorrelation and a correlation between the separated time-series patterns, and predict and output the volume of exports and imports at a time t+1, t+2, . . . the user desires to predict.

6. Application Example in Manufacturing

When applying the present disclosure to 'product manufacturing time prediction' in the manufacturing field, a user may use product manufacturing time data before a time t as input data, separate three time-series patterns, that is, trend, cycle, and remainder patterns, included in the input data, train an autocorrelation and a correlation between the separated time-series patterns, and predict and output product the manufacturing time at a time t+1, t+2, . . . the user desires to predict.

A make-to-order company may decrease tardiness and a business risk by accurately predicting the total manufacturing time needed for product manufacturing. Therefore, the present disclosure may be importantly used in a smart manufacturing system, and when using the present disclosure, the prediction accuracy of the smart manufacturing system may increase.

The methods according to the above-described examples may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), RAM, flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of embodiments have been described above. Nevertheless, it should be understood that various modifications may be made to these embodiments. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

What is claimed is:

1. A computer for providing a correlation recurrent unit comprised in a correlation recurrent neural network, the computer comprising:

at least one processing device; and memory storing instructions that, when executed by the at least one processing device individually or collectively, cause the computer to:

decompose, using a seasonal-trend decomposition cell, time-series data ($x_t$) corresponding to a time (t) when the time-series data ($x_t$) is input, based on a selected time-series composition algorithm, into a plurality of time-series components;

obtain, using an autocorrelation gate, an autocorrelation degree with a hidden state value corresponding to a previous time (t−1) of each of the plurality of time-series components with respect to each of the plurality of time-series components;

obtain, using a correlation gate, a correlation degree with a hidden state value corresponding to a previous time (t−1) of another time-series component different from each of the plurality of time-series components with respect to each of the plurality of time-series components; and determine, using a generation gate, whether to update the hidden state value of the previous time (t−1) generated for each of the plurality of time-series components, based on the autocorrelation degree and the correlation degree, when previous time-series data ($x_{t-1}$) prior to the time-series data ($x_t$) is input;

wherein the generation gate is configured to:

identify a first time-series component, of which the autocorrelation degree or the correlation degree is closer to 1 in a predetermined range between 0 to 1 than other time-series components of the plurality of time-series components, and with respect to the first time-series component, use a hidden state value ($h_t$) at the time (t) when the hidden state value ($h_t$) is generated without updating a previous hidden state value ($h_{t-1}$) corresponding to the previous time (t−1); and wherein the correlation recurrent neural network is trained by increasing a weight on the previous hidden state value ($h_{t-1}$) of relevance based on a degree the previous hidden state value ($h_{t-1}$) is used when generating a current hidden state value in accordance with the autocorrelation degree or the correlation degree.

2. The computer of claim 1, wherein the generation gate is configured to identify a second time-series component, of which the autocorrelation degree or the correlation degree is closer to 0 in a predetermined range between 0 to 1 than other time-series components of the plurality of time-series components, and with respect to the second time-series component, generate the hidden state value ($h_t$) at the time (t) by updating the previous hidden state value ($h_{t-1}$) corresponding to the previous time (t−1).

3. The computer of claim 1, wherein the seasonal-trend decomposition cell is configured to decompose, based on a seasonal-trend decomposition algorithm, the time-series data ($x_t$) into the plurality of time-series components comprising at least a seasonal component ($x_{t\_seasonal}$) that is a time-series component relevant to a periodic pattern repeated from the time (t), and a trend component ($x_{t\_trend}$) that is a time-series component relevant to an upward or downward trend from the time (t).

4. The computer of claim 3, wherein the autocorrelation gate is configured to estimate and obtain a first autocorrelation degree $$(\hat{a}_t^t)$$

with a first hidden state value ($h_{t-1\_trend}$) corresponding to the previous time (t−1) of the same trend component as the trend component ($x_{t\_trend}$) of the plurality of time-series components, and estimate and obtain a second autocorrelation degree $$(\hat{a}_t^s)$$

with a second hidden state value ($h_{t-1\_seasonal}$) corresponding to the previous time (t−1) of the same seasonal component as the seasonal component ($x_{t\_seasonal}$) of the plurality of time-series components.

5. The computer of claim 4, wherein the correlation gate is configured to estimate and obtain a first correlation degree $$(\hat{c}_t^t)$$

with the second hidden state value ($h_{t-1\_seasonal}$) corresponding to the previous time (t−1) of a seasonal component different from the trend component ($x_{t\_trend}$) of the plurality of time-series components, and estimate and obtain a second correlation degree $$(\hat{c}_t^s)$$

with the first hidden state value ($h_{t-1\_trend}$) corresponding to the previous time (t−1) of a trend component different from the seasonal component ($x_{t\_seasonal}$) of the plurality of time-series components.

6. The computer of claim 5, wherein the generation gate is configured to respectively perform a Hadamard product operation with the previous hidden state value ($h_{t-1}$) at the previous time (t−1) on the first and second autocorrelation degrees $$(\hat{a}_t^t) \text{ and } (\hat{a}_t^s)$$

and the first and second correlation degrees $$(\hat{c}_t^t) \text{ and } (\hat{c}_t^s),$$

evaluate a correlation of the previous hidden state value ($h_{t-1}$) at the previous time (t−1) with the time-series data ($x_t$), based on a value obtained from the Hadamard product operation, and determine, based on the correlation, whether to update the previous hidden state value ($h_{t-1}$) at the previous time (t−1) that is generated for each of the plurality of time-series components.

7. A computer for providing a correlation recurrent neural network comprising a plurality of correlation recurrent units for predicting time-series data, computer comprising:

at least one processing device; and memory storing instructions that, when executed by the at least one processing device individually or collectively, cause the computer to:

decompose, using a seasonal-trend decomposition cell, time-series data ($x_t$) at a time (t) into a trend component ($x_{t\_trend}$), a seasonal component ($x_{t\_seasonal}$), and a remainder component ($x_{t\_remainder}$) when the time-series data ($x_t$) is input;

estimate and obtain, using an autocorrelation gate, with respect to the trend component ($x_{t\_trend}$) at the time (t), a first autocorrelation degree $$(\hat{a}_t^t)$$

with a first hidden state value relevant to a trend component ($x_{t-1\_trend}$) corresponding to a previous time (t−1) prior to the time (t) and estimate and obtain, for the seasonal component ($x_{t\_seasonal}$) at the time (t), a second autocorrelation degree $$(\hat{a}_t^s)$$

with a second hidden state value relevant to the seasonal component ($x_{t-1\_seasonal}$) corresponding to the time (t−1);

estimate and obtain, using a correlation gate, first correlation degree $$(\hat{c}_t^t)$$

with the second hidden state value with respect to the trend component ($x_{t\_trend}$) at the time (t) and estimate and obtain a second correlation degree $$(\hat{c}_t^s)$$

with the first hidden state value with respect to the seasonal component ($x_{t\_seasonal}$) at the time (t); and increase, using a generation gate, when generating a hidden state value of each of a plurality of time-series components at the time (t), a proportion of using the first hidden state value and the second hidden state value that are generated when previous time-series data ($x_{t-1}$) at the previous time (t−1) is input as the first and second correlation degrees $$(\hat{a}_t^t) \text{ and } (\hat{a}_t^s)$$

and the first and second autocorrelation degrees $$(\hat{c}_t^t) \text{ and } (\hat{c}_t^s)$$

increase;

wherein the generation gate is configured to:
  identify a first time-series component, of which the first autocorrelation degree or the first correlation degree is closer to 1 in a predetermined range between 0 to 1 than other time-series components of the plurality of time-series components, and
  with respect to the first time-series component, use the first hidden state value at the time (t) when the first hidden state value is generated without updating a previous hidden state value corresponding to the previous time (t−1); and wherein the correlation recurrent neural network is trained by increasing a weight on the previous hidden state value of relevance based on a degree the previous hidden state value is used when generating a current hidden state value in accordance with the first autocorrelation degree or the first correlation degree.

* * * * *